(12) United States Patent
Wootten

(10) Patent No.: US 12,543,701 B2
(45) Date of Patent: Feb. 10, 2026

(54) PET FOOD STORAGE APPARATUS TO STORE AND SERVE FOOD

(71) Applicant: Tyler Wootten, Neenah, WI (US)

(72) Inventor: Tyler Wootten, Neenah, WI (US)

( * ) Notice: Subject to any disclaimer, the term of this patent is extended or adjusted under 35 U.S.C. 154(b) by 0 days.

(21) Appl. No.: 18/767,660

(22) Filed: Jul. 9, 2024

(65) Prior Publication Data

US 2024/0357994 A1  Oct. 31, 2024

Related U.S. Application Data

(63) Continuation-in-part of application No. 18/122,084, filed on Mar. 15, 2023, now Pat. No. 12,213,459.

(51) Int. Cl.
| | | |
|---|---|---|
| *A01K 5/01* | (2006.01) | |
| *A01K 7/00* | (2006.01) | |
| *B65D 25/04* | (2006.01) | |
| *B65D 25/28* | (2006.01) | |

(52) U.S. Cl.
CPC ............ *A01K 5/0107* (2013.01); *A01K 7/005* (2013.01); *B65D 25/04* (2013.01); *B65D 25/2867* (2013.01)

(58) Field of Classification Search
CPC .............................. A01K 5/0114; B65D 25/04
See application file for complete search history.

(56) References Cited

U.S. PATENT DOCUMENTS

| | | | | |
|---|---|---|---|---|
| 1,811,439 | A * | 6/1931 | Scherz | B65D 25/04 206/544 |
| 5,054,431 | A | 10/1991 | Coviello | |
| 5,787,839 | A | 8/1998 | Magnant | |
| 5,823,136 | A * | 10/1998 | Zarski | A01K 7/00 119/51.5 |
| 5,884,580 | A | 3/1999 | Faircloth | |
| 6,786,177 | B1 * | 9/2004 | Lemkin | A01K 7/00 119/51.01 |
| 6,843,205 | B1 * | 1/2005 | Segreto | A01K 5/0114 119/515 |
| 7,938,083 | B1 | 5/2011 | Huether | |
| 8,772,685 | B2 * | 7/2014 | Backaert | A47J 27/04 219/688 |
| 10,448,614 | B1 * | 10/2019 | Tsengas | A01K 7/00 |

(Continued)

OTHER PUBLICATIONS

Stanley Classic Lunch Box | 10 QT, 2022, https://www.stanley1913.com/products/classic-lunch-box?variant=39681118240827 (Year: 2022).*

*Primary Examiner* — William L Gmoser
(74) *Attorney, Agent, or Firm* — Vani Moodley, Esq.

(57) ABSTRACT

The present invention provides a pet food storage apparatus (100) to store and serve pet food. The storage apparatus (100) includes a container (10) having a bottom wall (12), a sidewall (14), and an opening (16) defining a hollow portion (15). An extruded portion (30) is radially extended internally from the sidewall (14). Further, the storage apparatus (100) includes a first bowl (40*a*), and a second bowl (40*b*) arranged in a nested configuration. The second bowl (40*b*) is adapted to store the leash (50). The first bowl (40*a*) and the second bowl (40*b*) are removable from the container (10) to serve food or water to the pet. Further, the storage apparatus (100) has a lid (60*a*) that is removably attached to the container (10) using a buckle arrangement (70). The lid (60*a*) has a foldable handle (25*a*) that is configurable in a folded state and an open state.

16 Claims, 7 Drawing Sheets

(56) References Cited

U.S. PATENT DOCUMENTS

| | | | |
|---|---|---|---|
| 10,577,474 B2* | 3/2020 | Gandhi | B29C 66/73921 |
| 2007/0137586 A1 | 6/2007 | Park | |
| 2017/0118951 A1* | 5/2017 | Hollis | A01K 5/0107 |
| 2017/0349344 A1* | 12/2017 | Weinberg | B65D 43/22 |
| 2021/0300646 A1* | 9/2021 | Yu | B65D 83/0888 |
| 2022/0201973 A1* | 6/2022 | Kim | B65D 21/0233 |
| 2023/0143160 A1* | 5/2023 | Whitta | B65D 55/02 |
| | | | 206/508 |
| 2025/0057113 A1* | 2/2025 | Myers, Jr. | A01K 5/0114 |

* cited by examiner

PET FOOD STORAGE APPARATUS TO STORE AND SERVE FOOD

RELATED APPLICATION

This application is a continuation-in-part of U.S. patent application Ser. No. 18/122,084 entitled A Pet Food Storage Apparatus to Store and Serve Food filed Mar. 15, 2023, which is incorporated herein in its entirety by reference.

TECHNICAL FIELD

The present invention relates to a food storage apparatus. More particularly, the present invention relates to a pet food storage apparatus to store and serve pet food.

BACKGROUND

A significant number of individuals own dogs, cats, or other pets. Many of these pet owners encounter challenges in transporting food, water, and other essential items for their pets. Even when pet owners bring food and water in separate containers or bottles, animals typically consume from open vessels. This necessitates that pet owners also carry additional bowls or dishes to pour and serve the food and water to their pets.

Typically, pet food storage apparatuses consist solely of food or water storage containers and lack integrated serving vessels or bowls.

Currently, storage apparatuses that include serving bowls tend to occupy a significant portion of the available storage space.

Consequently, there is a need for a pet food storage apparatus that can both store and serve pet food, addressing the limitations of existing designs.

SUMMARY

The object of the present invention is to provide a pet food storage apparatus to store and serve pet food.

Another object of the present invention is to provide a pet food storage apparatus to store and serve pet food, having separate food and water bowls to serve food.

Another object of the present invention is to provide a pet food storage apparatus to store and serve pet food, which allows to store the serving vessels or bowls.

A further object of this invention is to provide a pet food storage apparatus to store and serve pet food, which is simple in construction.

A still further object of this invention is to provide a pet food storage apparatus to store and serve pet food, which is convenient to hold and carry while walking with a pet.

According to one aspect of the present invention, there is provided a pet food storage apparatus to store and serve food. The food storage apparatus includes a container to store the food or water for the pet, a first bowl and a second bowl to serve the food and water to the pets whenever required.

The container is having a bottom, a sidewall, and an opening to define a hollow portion to store pet essentials. The container is having a cylindrical shape and a circular opening from the top. In another embodiment, the container may have any other shape creating the hollow portion to store pet essentials.

The container is having an attachment to configure the handle with the container. The handle is provided to carry the container by holding the handle.

The sidewall of the container is having an extruded portion that is radially extending internally from an inner side of the sidewall.

A first bowl is removably arranged on the extruded portion. The first bowl is shaped and sized to insert within the container. The diameter of the first bowl decreases gradually towards a base to create a depressed cavity within the first bowl. The first bowl is having a shape like the inverted frustum. The first bowl is having an edge extending radially outward from the first bowl.

The first bowl is removably arranged within the container in such a way that the edge of the first bowl is coaxially aligned with the extruded portion of the sidewall of the container to hold the first bowl thereon.

Further, the second bowl is removably arranged within the container. The second bowl is shaped and sized similarly to the first bowl. The second bowl is also having an edge extending radially outward from the second bowl like the first bowl. The second bowl is removably arranged within the first bowl in a nested configuration so that additional space required to store the second bowl is eliminated. The second bowl is removably arranged within the first bowl in such a way that the edge of the second bowl is coaxially aligned with the edge of the first bowl to hold the second bowl thereon.

In another embodiment, the extruded portion is made of rubber material to provide a leak-proof arrangement to avoid the leakage of water stored inside the container.

When the second bowl is in a nested configuration with the first bowl, then the depressed cavity of the first bowl is occupied by the second bowl, and the depressed cavity of the second bowl is used to store an accessory. In another embodiment, the depressed cavity of the second bowl may be used to store a dog leash.

In another aspect of the present invention, the container is having multiple compartments vertically configured on the base of the container sharing the common base of the container below the first bowl and the second bowl to separately store the pet essentials. Wherein, the multiple compartments include a first vertical compartment to store water and a second vertical compartment to store food. The multiple compartments are having removable covers to open and close the compartments from the opening of the container. Further, the first vertical compartment is having a secondary opening to pour the water into the second bowl without removing the first bowl from the opening of the container. A cap is provided on the secondary opening to allow opening and closing of the first vertical compartment as per the requirement.

In another aspect of the present invention, multiple compartments are horizontally configured on the base of the container sharing the common sidewall of the container in a stacked manner below the first bowl and the second bowl to separately store the pet essentials. Wherein, the multiple compartments include a first horizontal compartment to store pet food and a second horizontal compartment to store water. The first horizontal compartment is having a removable cover to open and close the first horizontal compartment. The second horizontal compartment is having an inlet or outlet opening to pour the water into the second bowl without removing the first bowl from the opening of the container. A cap is provided with the inlet or outlet opening to allow the opening and closing of the second horizontal compartment as per requirement.

A lid is provided to open or close the opening of the container. The lid is removably attached to the container to allow the pet owner to open or close the container whenever required.

In the present aspect of the invention, the lid is equipped with a foldable handle on a top surface of the lid for carrying the pet food storage apparatus while the lid is attached to the container. Further, the buckle arrangement having at least two buckle locks secured on the sidewall of the container and engageable with the lid to hold the lid on the container firmly.

In one aspect of the invention, the container is having a thread arrangement around the opening of the container to removably attach the lid to the container for opening or closing the container.

In another aspect of the invention, the container is having a snap-fit arrangement to removably attach the lid to the container for opening or closing of the container.

When the lid is removed from the container, the pet owner has access to the hollow portion of the container. Further, the second bowl and the first bowl are removed from the nested configuration and placed on a flat surface to serve the food. When the first bowl and the second bowl are removed from the container, the food and water stored in the container are poured into the first bowl and the second bowl. The first bowl is used to serve the food and the second bowl is used to serve the water to the pet.

After being used, the first bowl and the second bowl are again arranged inside the container in the nested configuration. Further, the lid is attached to the container to close the opening of the container.

In an aspect, the top surface of the lid has a recessed region, preferably a rectangular recessed region to pivotably receive the foldable handle therein allowing a folded state and an open state of the foldable handle.

In an aspect, the buckle lock includes a support plate, a lever pivotably attached to an end portion of the support plate, and a latch arm pivotably connected to the lever and adaptable to engage with the lid to firmly hold the lid on the container.

In an aspect, the lid is having a rim that is vertically extending from the circumference of the lid and adapted to receive the latch arm thereon.

In an aspect, the support plate is fixedly attached on the sidewall of the container using a plurality of rivets.

In another aspect, the latch arm has a first end that is engageable with the lid and a second end that is connected to the lever.

In an aspect, the end portion of the support plate is adapted to receive the lever allowing a pivotal movement of the lever around a first axis, wherein the latch arm is pivotably connected to the lever at an end portion that is near to the first axis allowing a pivotal movement of a second end of the latch arm around a second axis.

BRIEF DESCRIPTION OF THE DRAWINGS

Other features and advantages of the invention will become apparent when reading the detailed description given below, purely by way of example and in a non-limitative manner, referring to the following figures.

DETAILED DESCRIPTION

An embodiment of this invention, illustrating its features, will now be described in detail. The words "comprising, "having, "containing," and "including," and other forms thereof, are intended to be equivalent in meaning and be open ended in that an item or items following any one of these words is not meant to be an exhaustive listing of such item or items, or meant to be limited to only the listed item or items.

The terms "first," "second," and the like, herein do not denote any order, quantity, or importance, but rather are used to distinguish one element from another, and the terms "an" and "a" herein do not denote a limitation of quantity, but rather denote the presence of at least one of the referenced item.

The disclosed embodiments are merely exemplary of the invention, which may be embodied in various forms.

The present invention provides a pet food storage apparatus to store and serve pet food. The pet food storage apparatus provides a storage space to store the pet essentials like food, water, or leash. Further, the pet food storage apparatus provides an arrangement to store serving vessels or bowls for the pets in a confined space.

Figure 1:
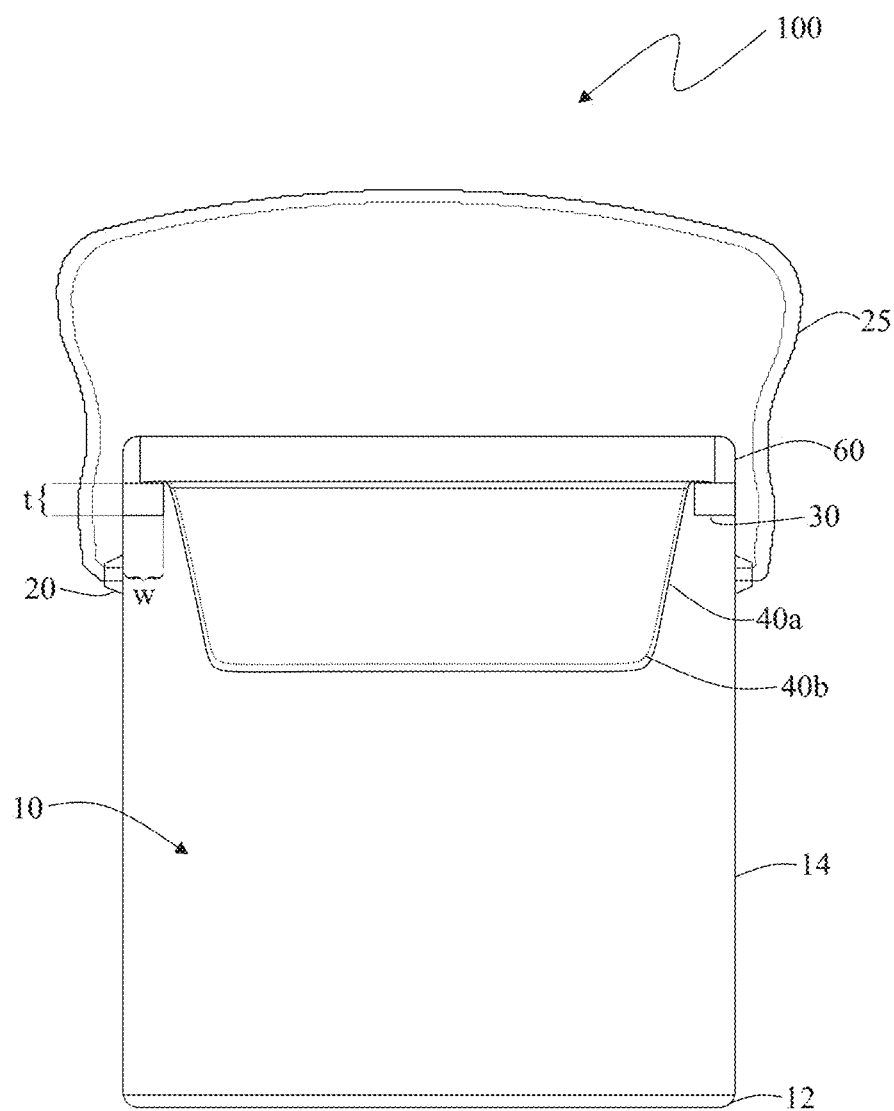
FIG. 1 illustrates an assembled view of a pet food storage apparatus to store and serve food in accordance with an embodiment of the present invention.
Figure 2:
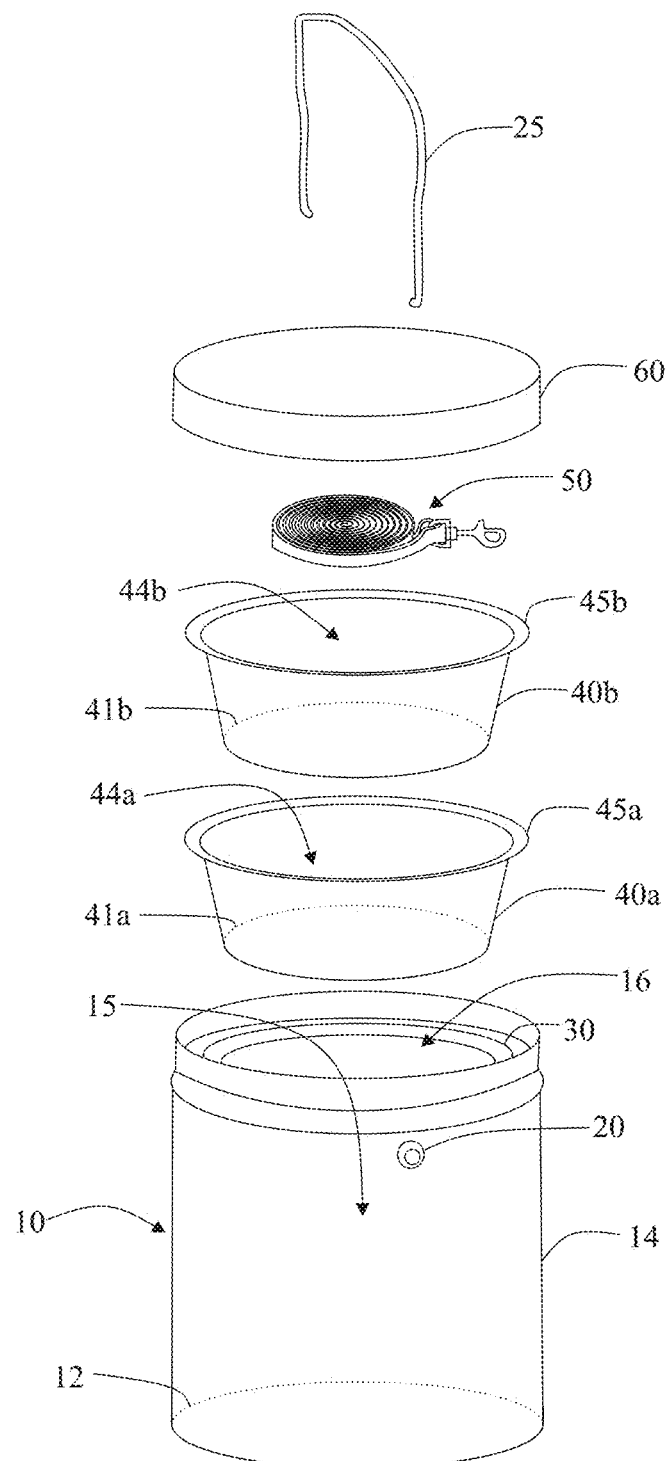
FIG. 2 illustrates an exploded view of the pet food storage apparatus to store and serve food.

Referring now to FIGS. 1 and 2, a pet food storage apparatus to store and serve pet food in accordance with the present invention is illustrated. From hereafter, the word "a pet food storage apparatus (100) to store and serve pet food" is referred to as "the storage apparatus (100)". The storage apparatus (100) includes a container (10) having a bottom wall (12), a sidewall (14), and an opening (16) defining a hollow portion (15) to store pet essentials such as food or water.

The container (10) is having a cylindrical shape and a circular opening (16) from an upper side of the container (10). The container (10) may have any other shape creating the hollow portion (15) to store pet essentials. The container (10) is having a handle (25) to hold the storage apparatus. An attachment (20) is configured on the sidewall (14) to arrange the handle (25) with the container (10). The handle (25) is provided to carry the storage apparatus (100) by holding the handle (25).

The sidewall (14) is having an extruded portion (30) that is radially extending internally from an inner side of the sidewall (14). The extruded portion (30) is having a thickness (t). The extruded portion (30) is adapted to accommodate multiple bowls in a stacked manner.

In another embodiment, the extruded portion (30) is made of rubber material to provide a leak-proof arrangement to avoid the leakage of water stored inside the container (10).

In the present embodiment, two bowls like a first bowl and a second bowl are arranged inside the container. The first bowl (40a) is arranged on the extruded portion (30) of the sidewall (14). The first bowl (40a) is shaped and sized to insert within the container (10). The diameter of the first bowl (40a) decreases gradually towards a base (41a) creating a depressed cavity (44a) within the first bowl (40a). The first bowl (40a) is having a shape like the inverted frustum. The first bowl (40a) is having an edge (45a) extending radially outward from the first bowl (40a).

The extruded portion (30) is having a width (w), and the width (w) of the extruded portion (30) is extended enough to hold the edge (45a) of the first bowl (40a). Arranging the first bowl (40a) on the extruded portion (30) closes the opening (16) of the container (10).

In a closed configuration of the storage apparatus (100) shown in FIG. 1, the first bowl (40a) is removably arranged within the container (10) in such a way that the edge (45a) of the first bowl (40a) is aligned with the extruded portion (30) of the sidewall (14) of the container (10) to hold the first bowl (40a) thereon.

Further, the second bowl (40b) is shaped and sized similarly to the first bowl (40a). The diameter of the second bowl (40b) decreases gradually towards a base (41b) creating a depressed cavity (44b) within the second bowl (40b). The second bowl (40b) is also having an edge (45b) extending radially outward from the second bowl (40b) like the first bowl (40a). The second bowl (40b) is removably arranged within the first bowl (40a) in a nested configuration so that additional space required to store the second bowl (40b) is eliminated.

The second bowl (40b) is removably arranged within the first bowl (40a) in such a way that the edge (45b) of the second bowl (40b) is coaxially aligned with the edge (45a) of the first bowl (40a) and the extruded portion (30) of the container (10) to hold the second bowl (40b) thereon. The extruded portion (30) holds the first bowl (40a) and the second bowl (40b) coaxially in the hollow portion (15) of the container (10).

When the second bowl (40b) is in a nested configuration with the first bowl (40a), the depressed cavity (44a) of the first bowl (40a) is occupied by the second bowl (40b), and the depressed cavity (44b) of the second bowl (40b) is used to store an accessory, while the pet is roaming free in a park or any other open space. The second bowl (40b) can also be used to store a leash (50).

Figure 3:
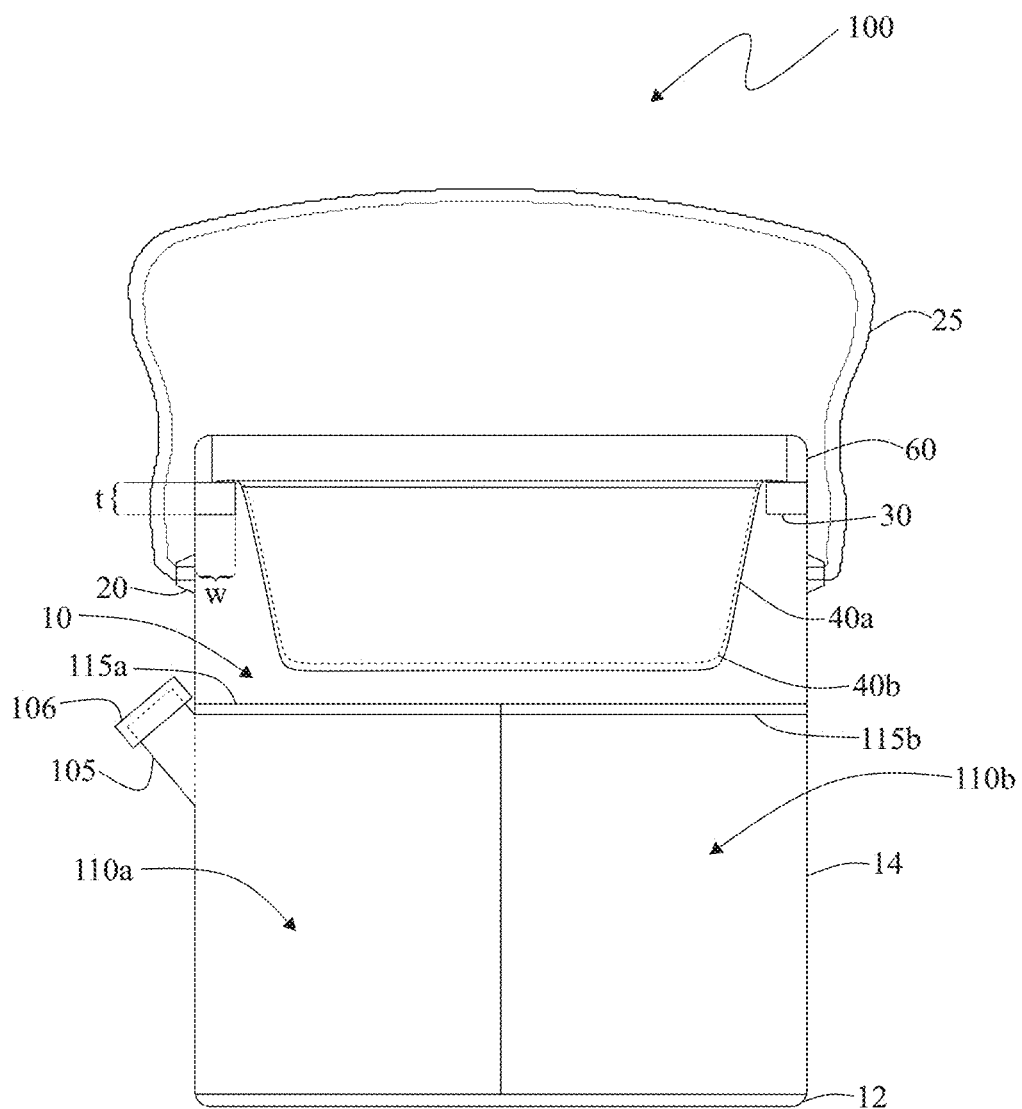
FIG. 3 illustrates a second embodiment of the pet food storage apparatus to store and serve food in accordance with the present invention.

In a second embodiment of the present invention, referring to FIG. 3, the container is having multiple compartments vertically configured on the base (12) of the container (10) sharing the common base (12) of the container (10) below the first bowl (40a) and the second bowl (40b) to separately store the pet essentials. Wherein, the multiple compartments include a first vertical compartment (110a) to store water and a second vertical compartment (110b) to store food. The multiple compartments are having removable covers (115a, 115b) to open and close the compartments from the opening (16) of the container (10). Further, the first vertical compartment (110a) is having a secondary opening (105) to pour the water into the second bowl (40b) without removing the first bowl (40a) from the opening (16) of the container (10). A cap (106) is provided on the secondary opening (105) to allow opening and closing of the first vertical compartment (105) as per the requirement. A person skilled in the art can configure more than two vertical compartments inside the container as described herein.

Figure 4:
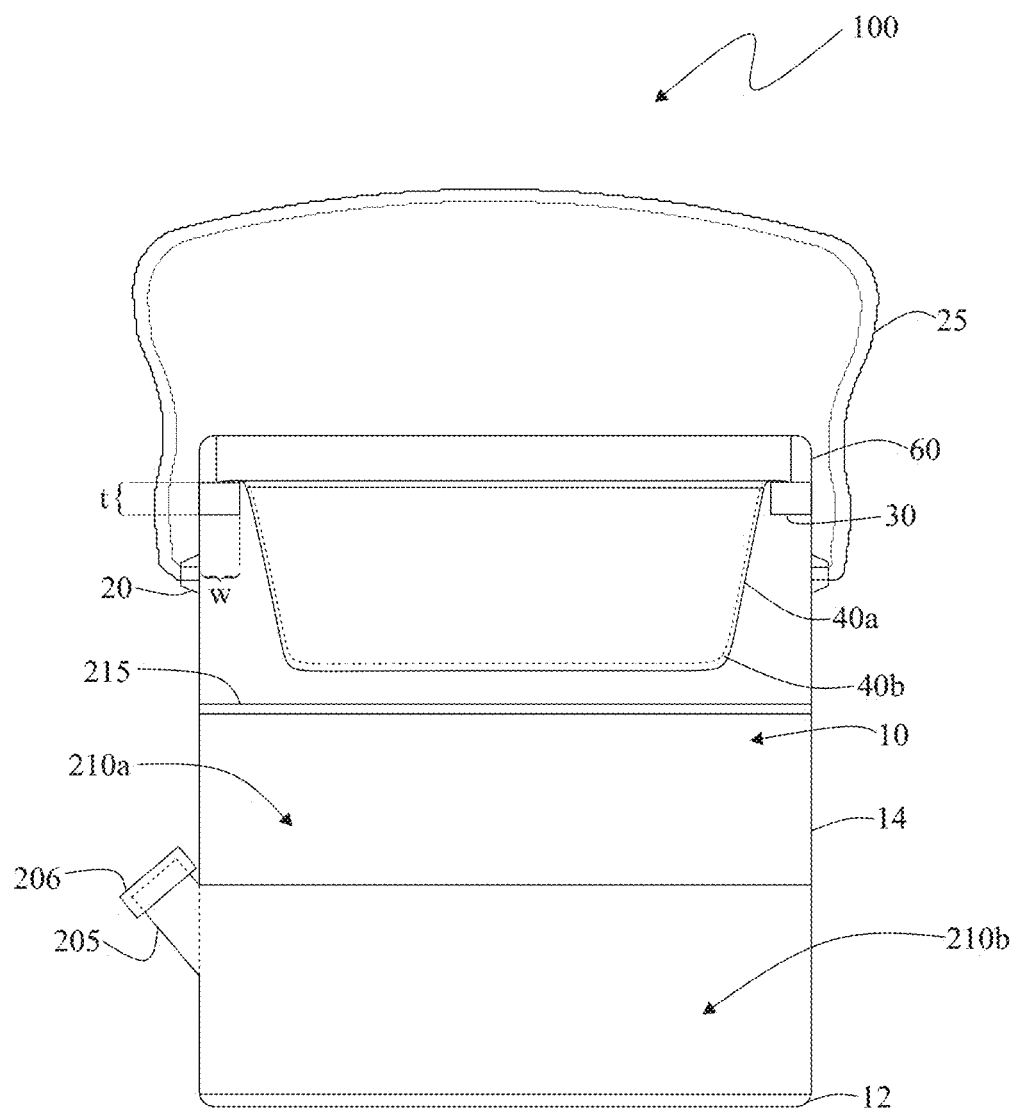
FIG. 4 illustrates a third embodiment of the pet food storage apparatus to store and serve food in accordance with the present invention.

In a third embodiment of the present invention, referring to FIG. 4, multiple compartments are horizontally configured on the base (12) of the container (10) sharing the common sidewall (14) of the container (10) in a stacked manner below the first bowl (40a) and the second bowl (40b) to separately store the pet essentials. Wherein, the multiple compartments include a first horizontal compartment (210a) to store pet food and a second horizontal compartment (210b) to store water. The first horizontal compartment (210a) is having a removable cover (215) to open and close the first horizontal compartment (210a). The second horizontal compartment (210b) is having an inlet or outlet opening (205) to pour the water into the second bowl (40b) without removing the first bowl (40a) from the opening (16) of the container (10). A cap (206) is provided with the inlet or outlet opening (205) to allow the opening and closing of the second horizontal compartment (210b) as per requirement. A person skilled in the art can configure more than two horizontal compartments inside the container in the stacked manner as described herein.

Further, the storage apparatus (100) includes a lid (60) that is provided to open or close the opening (16) of the container (10). The lid (60) is removably attached to the container (10) to allow the pet owner to open or close the container (10) whenever required. The lid (60) is provided for securely sealing the container (10), ensuring that the pet food remains fresh and free from contaminants.

Figure 5A:
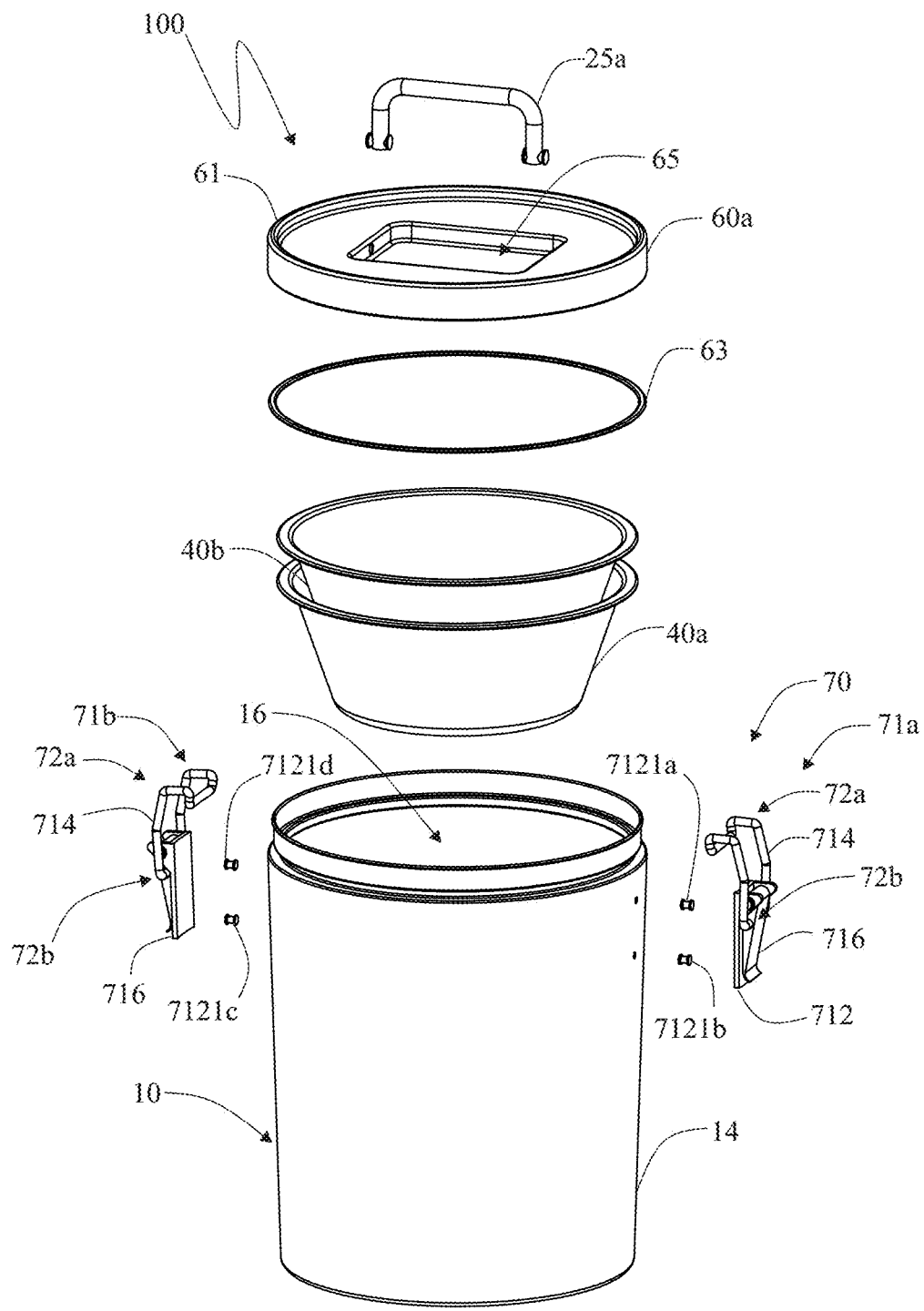
FIG. 5a illustrates an exploded view of the pet food storage apparatus to store and serve food in accordance with a fourth embodiment of the present invention.
Figure 5B:
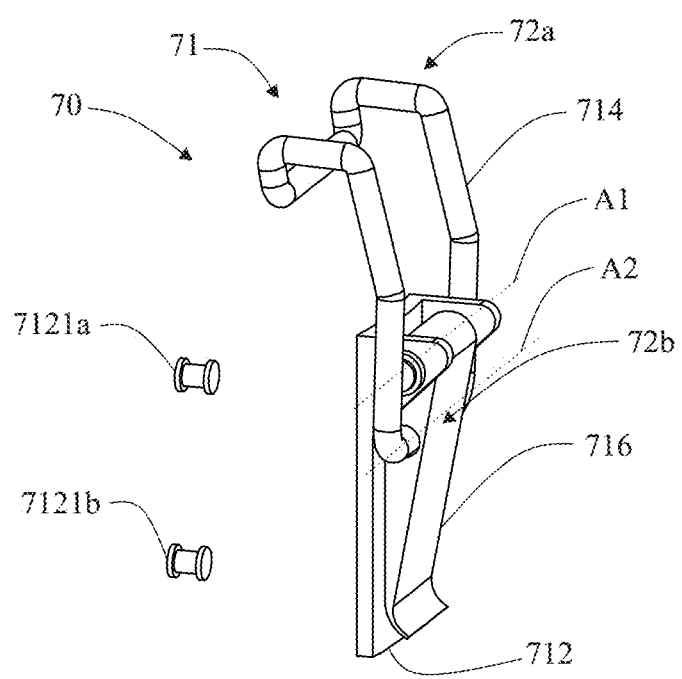
FIG. 5b illustrates a buckle arrangement in accordance with the fourth embodiment of the present invention.
Figure 6:
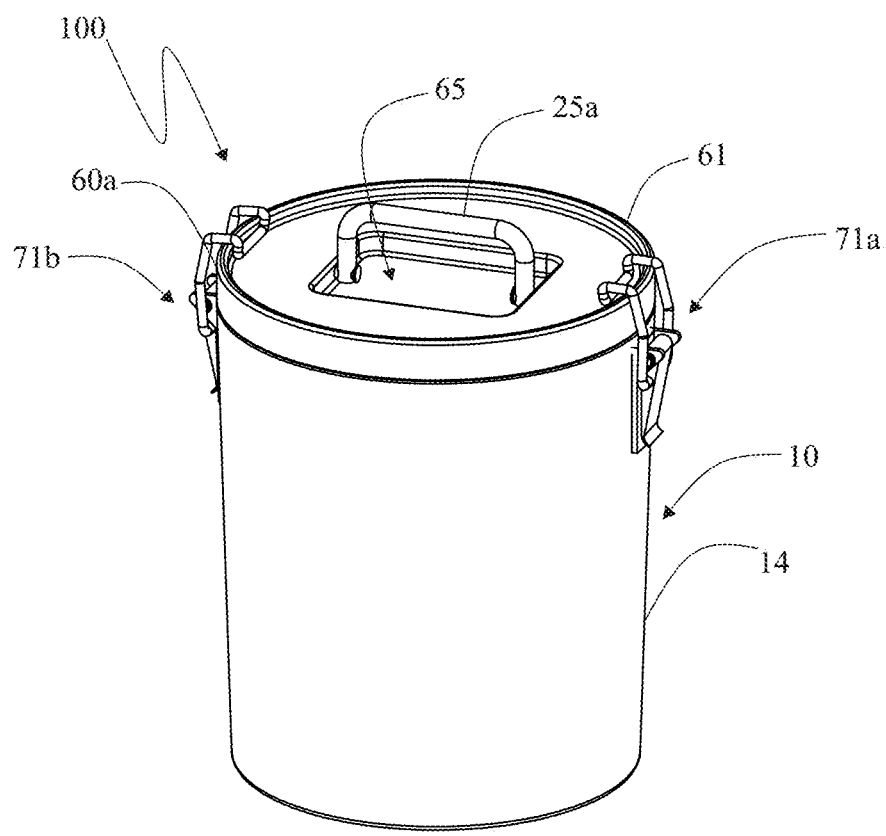
FIG. 6 illustrates the pet food storage apparatus to store and serve food in accordance with the fourth embodiment of the present invention.

In the fourth embodiment of the present invention, referring to FIGS. 5a, 5b, and 6, the lid (60a) is equipped with a foldable handle (25a) integrated into a top surface of the lid (60a), enhancing the portability of the storage apparatus (100). Specifically, the top surface of the lid (60a) has a recessed region (65) provided to accommodate the foldable handle (25a). The recessed region (65) prevents the foldable handle (25a) from protruding, thereby preventing any unnecessary bulk or snagging out of the lid (60a). The recessed region (65) is a preferably rectangular recessed region and is designed to pivotably receive the foldable handle (25a). It may be obvious for a person skilled in the art to configure the recessed region (65) having any other shape to accommodate the foldable handle (25a) therein.

The lid (60a) includes a gasket (63) arranged therein to securely seal the container (10) to prevent leakage and spillage.

The foldable handle (25a) is positioned in either a folded state or an open state. The foldable handle (25a) is adapted to lie flat within the recessed region (65) when not in use, and when needed, the foldable handle (25a) can be easily unfolded, providing a sturdy grip for carrying the storage apparatus (100).

The storage apparatus (100) includes a buckle arrangement (70) for secure and reliable sealing of the container (10) using the lid (60a). The buckle arrangement (70) includes at least two buckle locks (71a, 71b) that are secured on the sidewall (14) of the container (10). The buckle lock (71) is engageable with the lid (60a) ensuring that the lid (60a) remains firmly attached to the container (10). The buckle lock (71) includes a support plate (712), a lever (716) pivotably attached to an end portion of the support plate (712), and a latch arm (714) pivotably connected to the lever (716) and adaptable to engage with the lid (60a) to firmly hold the lid (60a) on the container (10).

In the present embodiment, the support plate (712) of the buckle lock (71) is fixedly attached to the sidewall (14) of the container (10) using a plurality of rivets (7121a, 7121b, 7121c, 7121d). It is obvious for a person skilled in the art to use any other arrangement to fixedly attach the buckle lock (71) to the sidewall (14) of the container (10).

The end portion of the support plate (712) is adapted to receive the lever (716). The lever (716) is connected to the end portion of the support plate (712) forming a first axis (A1) around which the lever (716) is pivotable to lock or unlock the buckle lock (71).

The latch arm (714) of the buckle lock (71) has a first end (72a) that is engageable with the lid (60a) and a second end (72b) opposite to the first end (72a) adapted to pivotably connect with the lever (716). The first end (72a) of the latch arm (714) is having a hook-liked structure configured to engage with the lid (60a). Specifically, the lid (60a) has a rim (61) that vertically extends from the circumference of the lid (60a) to receive the hook-liked structure of the latch arm (714). The hook-liked structure engages with the rim (61) of the lid (60a) and forms a locking connection therebetween when the buckle lock (71) is in a locking position.

The second end (72b) of the latch arm (714) is connected to the lever (716) at an end portion that is near the first axis (A1). The latch arm (714) is connected to the lever (716) forming a second axis (A2) around which the second end (72b) of the latch arm (714) is pivotable to lock or unlock the buckle lock (71).

In an exemplary embodiment, to attach the lid (60a) to the container (10), the lid (60a) is placed on the container (10) covering the opening (16) of the container (10). The storage apparatus (100) has two buckle locks (71a, 71b) arranged opposite to each other on the sidewall (14) of the container (10) to firmly hold the lid (60a) from both sides. The hook-shaped structure of the latch arm (714) is engaged with the rim (61) of the lid (60a) with the lever (716) being at an angled position with respect to the support plate (712) and the sidewall (14) of the container (10). Upon pressing the lever (716) towards the sidewall (14) of the container (10) and configuring each buckle lock (71a, 71b) in the locking position, the hook-shaped structure of each buckle lock (71) engages with the rim (61) of the lid (60a) having the locking connection therebetween. Further, to unlock the buckle lock (71), the lever (716) needs to be pulled against the sidewall (14) of the container (10) thereby releasing the locking connection between the latch arm (714) and the lid (60a). After pulling the lever (716) and removing the hook-shaped structure of the latch arm (714), the lid (60a) is removable from the container (10) allowing to access the food stored in the container (10).

Furthermore, when food or water has to be served to the pets, the lid (60a) is removed from the container (10) to access the hollow portion (15) of the container (10). Further, the second bowl (40b) and the first bowl (40a) are removed from the container (10). The food and water stored in the hollow portion (15) of the container (10) are poured into the first bowl (40a) and the second bowl (40b) respectively and is served to the pet. After being used, the first bowl (40a) and the second bowl (40b) are again arranged into the container (10) in the nested configuration. The lid (60a) is attached to the container (10) to close the opening (16) of the container (10).

Therefore, the storage apparatus (100) provides the container (10) to store pet food or pet essentials while walking with the pet. Further, the storage apparatus (100) provides the arrangement to carry the first bowl (40a) and the second bowl (40b) in the container (10) without any additional space required for the second bowl (40b). Further, the second bowl (40b) is used to store the leash (50) without losing it while walking with the pet. Furthermore, the buckle arrangement (70) is provided to securely attach the lid (60a) to the container (10). The foldable handle (25a) is arranged in the lid (60a) to enhance the portability of the storage apparatus (100).

The foregoing descriptions of specific embodiments of the present invention have been presented for purposes of illustration and description. They are not intended to be exhaustive or to limit the present invention to the precise forms disclosed, and obviously, many modifications and variations are possible in light of the above teaching. The embodiments were chosen and described in order to explain the principles of the present invention best and its practical application, to thereby enable others skilled in the art to best utilise the present invention and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present invention.

I claim:

1. A pet food storage apparatus (100) to store and serve pet food, the pet food storage apparatus (100) comprising:
    a container (10) having a bottom wall (12), a sidewall (14), and an opening (16) defining a hollow portion (15) to store pet essentials;
    an extruded portion (30) radially extending internally from the sidewall (14) of the container (10);
    a first bowl (40a) removably arranged on the extruded portion (30) in such a way that an edge (45a) of the first bowl (40a) coaxially aligns with the extruded portion (30) to hold the first bowl (40a) thereon;
    a second bowl (40b) removably arranged in a nested configuration over the first bowl (40a) in such a way that an edge (45b) of the second bowl (40b) coaxially aligns with the edge (45a) of the first bowl (40a), wherein the second bowl (40b) is adapted to store a dog leash (50);
    wherein the container (10) has multiple vertically configured compartments below the first bowl (40a) and the second bowl (40b) to separately store the pet essentials, the multiple vertically configured compartments include a first vertical compartment (110a) to store water and a second vertical compartment (110b) to store pet food;
    wherein the first vertical compartment (110a) and the second vertical compartment (110b) are having respective removable covers (115a, 115b), and the first vertical compartment (110a) is having a secondary opening (105) to pour water into the second bowl (40b) without removing the first bowl (40a) from the container (10);
    a lid (60a) removably attached to the container (10), the lid (60a) is equipped with a foldable handle (25a) on a top surface of the lid (60a) for carrying the pet food storage apparatus while the lid (60a) is attached to the container (10); and
    a buckle arrangement (70) having at least two buckle locks (71a, 71b) secured on the sidewall (14) of the container (10) and engageable with the lid (60a) to hold the lid (60a) on the container (10) firmly.

2. The pet food storage apparatus (100) as claimed in claim 1, wherein the edges (45a, 45b) of the first bowl (40a) and the second bowl (40b) extend radially outward from the corresponding bowls (40a, 40b) such that the extruded portion (30) holds the first bowl (40a) and the second bowl (40b) coaxially.

3. The pet food storage apparatus (100) as claimed in claim 1, wherein the top surface of the lid (60a) has a recessed region (65) to pivotably receive the foldable handle (25*a*) therein allowing a folded state and an open state of the foldable handle (25*a*).

4. The pet food storage apparatus (100) as claimed in claim 1, wherein the buckle lock (71) includes a support plate (712), a lever (716) pivotably attached to an end portion of the support plate (712), and a latch arm (714) pivotably connected to the lever (716) and adaptable to engage with the lid (60*a*) to firmly hold the lid (60*a*) on the container (10).

5. The pet food storage apparatus (100) as claimed in claim 4, wherein the lid (60*a*) has a rim (61) that is vertically extending from the circumference of the lid (60*a*) and adapted to receive the latch arm (714) thereon.

6. The pet food storage apparatus (100) as claimed in claim 4, wherein the support plate (712) is fixedly attached on the sidewall (14) of the container (10) using a plurality of rivets (7121*a*, 7121*b*, 7121*c*, 7121*d*).

7. The pet food storage apparatus (100) as claimed in claim 4, wherein the latch arm (714) has a first end (72*a*) that is engageable with the lid (60*a*) and a second end (72*b*) that is connected to the lever (716).

8. The pet food storage apparatus (100) as claimed in claim 4, wherein the end portion of the support plate (712) is adapted to receive the lever (716) allowing a pivotal movement of the lever (716) around a first axis (A1), wherein the latch arm (714) is pivotally connected to the lever (716) at an end portion that is near to the first axis (A1) allowing a pivotal movement of a second end of the latch arm (714) around a second axis (A2).

9. A pet food storage apparatus (100) to store and serve pet food, the pet food storage apparatus (100) comprising:
- a container (10) having a bottom wall (12), a sidewall (14), and an opening (16) defining a hollow portion (15) to store pet essentials;
- an extruded portion (30) radially extending internally from the sidewall (14) of the container (10);
- a first bowl (40*a*) removably arranged on the extruded portion (30) in such a way that an edge (45*a*) of the first bowl (40*a*) coaxially aligns with the extruded portion (30) to hold the first bowl (40*a*) thereon;
- a second bowl (40*b*) removably arranged in a nested configuration over the first bowl (40*a*) in such a way that an edge (45*b*) of the second bowl (40*b*) coaxially aligns with the edge (45*a*) of the first bowl (40*a*), wherein the second bowl (40*b*) is adapted to store a dog leash (50);
- wherein the container (10) has multiple horizontally configured compartments below the first bowl (40*a*) and the second bowl (40*b*) to separately store the pet essentials, the multiple horizontally configured compartments include a first horizontal compartment (210*a*) to store pet food and a second horizontal compartment (210*b*) to store water;
- wherein the first horizontal compartment (210*a*) is having a removable cover (215), and the second horizontal compartment (210*b*) is having an inlet or outlet opening (205) to pour water into the second bowl (40*b*) without removing the first bowl (40*a*) from the container (10);
- a lid (60*a*) removably attached to the container (10), the lid (60*a*) is equipped with a foldable handle (25*a*) on a top surface of the lid (60*a*) for carrying the pet food storage apparatus while the lid (60*a*) is attached to the container (10); and
- a buckle arrangement (70) having at least two buckle locks (71*a*, 71*b*) secured on the sidewall (14) of the container (10) and engageable with the lid (60*a*) to hold the lid (60*a*) on the container (10) firmly.

10. The pet food storage apparatus (100) as claimed in claim 9, wherein the edges (45*a*, 45*b*) of the first bowl (40*a*) and the second bowl (40*b*) extend radially outward from the corresponding bowls (40*a*, 40*b*) such that the extruded portion (30) holds the first bowl (40*a*) and the second bowl (40*b*) coaxially.

11. The pet food storage apparatus (100) as claimed in claim 9, wherein the top surface of the lid (60*a*) has a recessed region (65) to pivotably receive the foldable handle (25*a*) therein allowing a folded state and an open state of the foldable handle (25*a*).

12. The pet food storage apparatus (100) as claimed in claim 9, wherein the buckle lock (71) includes a support plate (712), a lever (716) pivotably attached to an end portion of the support plate (712), and a latch arm (714) pivotably connected to the lever (716) and adaptable to engage with the lid (60*a*) to firmly hold the lid (60*a*) on the container (10).

13. The pet food storage apparatus (100) as claimed in claim 9, wherein the lid (60*a*) has a rim (61) that is vertically extending from the circumference of the lid (60*a*) and adapted to receive the latch arm (714) thereon.

14. The pet food storage apparatus (100) as claimed in claim 9, wherein the support plate (712) is fixedly attached on the sidewall (14) of the container (10) using a plurality of rivets (7121*a*, 7121*b*, 7121*c*, 7121*d*).

15. The pet food storage apparatus (100) as claimed in claim 9, wherein the latch arm (714) has a first end (72*a*) that is engageable with the lid (60*a*) and a second end (72*b*) that is connected to the lever (716).

16. The pet food storage apparatus (100) as claimed in claim 9, wherein the end portion of the support plate (712) is adapted to receive the lever (716) allowing a pivotal movement of the lever (716) around a first axis (A1), wherein the latch arm (714) is pivotally connected to the lever (716) at an end portion that is near to the first axis (A1) allowing a pivotal movement of a second end of the latch arm (714) around a second axis (A2).

\* \* \* \* \*